United States Patent [19]

Schubert

[11] Patent Number: 5,090,560
[45] Date of Patent: Feb. 25, 1992

[54] DEVICE FOR ACCOMMODATING FLAT BLISTER PACKS, AND BLISTER PACK

[75] Inventor: Otto Schubert, Vienna, Austria

[73] Assignee: Lift Verkaufsgerate-Gesellschaft M.B.H., Austria

[21] Appl. No.: 455,435

[22] PCT Filed: May 26, 1988

[86] PCT No.: PCT/AT88/00037

§ 371 Date: Jan. 29, 1990

§ 102(e) Date: Jan. 29, 1990

[87] PCT Pub. No.: WO88/09141

PCT Pub. Date: Dec. 1, 1988

[30] Foreign Application Priority Data

May 27, 1987 [AU] Australia ............... 1360/87

[51] Int. Cl.⁵ .................... B65D 85/57; A47F 5/00
[52] U.S. Cl. .................... 206/309; 206/425; 211/40; 211/71
[58] Field of Search ............ 206/44 B, 44 R, 45, 206/307, 309, 425, 444, 449; 211/4, 7, 10, 11, 40, 41, 44, 71

[56] References Cited

U.S. PATENT DOCUMENTS

| | | | |
|---|---|---|---|
| 1,971,258 | 8/1934 | Hilliard | 206/45.19 |
| 2,321,339 | 6/1943 | Wadsworth | 211/4 |
| 2,593,927 | 4/1952 | Slattery | 211/40 |
| 3,788,717 | 1/1974 | Hosmer | 312/122 |
| 4,375,850 | 3/1983 | Smyth et al. | 206/387 |
| 4,448,303 | 5/1984 | Beckenfeld | 206/44 R |
| 4,477,016 | 10/1984 | Growney | 206/44 R |
| 4,582,194 | 4/1986 | Karpiloff et al. | 206/44 R |
| 4,589,549 | 5/1986 | Hehn | 206/387 |
| 4,949,853 | 8/1990 | Klein et al. | 211/10 |

FOREIGN PATENT DOCUMENTS

| | | |
|---|---|---|
| 0162999 | 12/1985 | European Pat. Off. |
| 0190546 | 8/1986 | European Pat. Off. |
| 2801567 | 7/1979 | Fed. Rep. of Germany |
| 2854366 | 7/1980 | Fed. Rep. of Germany |
| 1438550 | 4/1966 | France |
| 1373004 | 11/1974 | United Kingdom ........ 211/40 |

Primary Examiner—Jimmy G. Foster
Attorney, Agent, or Firm—Ladas & Parry

[57] ABSTRACT

There is described a device (1) for accommodating and displaying compact disc (CD) records (3) packed in flat blister packs (2), said blister packs below the records (3) having relatively thin extensions (8), with which they are insertable in substantially erect position into slot-shaped openings (7) in supporting base (5; 5a; 5b), a preferably closed accommodation space (10) being provided below said base; in the inserted condition the blister packs (2) with the transition from the thinner extension (8) to the thicker range (9), where the CD disc (3) is contained, abut the edge of the slot-shaped openings (7); preferably there are provided in the supporting base a plurality of rows one next to the other of slot-shaped openings (7) one after another; at least one lock bar (16), e.g., of flat steel is provided, slidable transversely to the direction of the rows from a position of rest next to the blister packs (2) to a locking position in engagement with lateral slots in the blister packs (2).

12 Claims, 2 Drawing Sheets

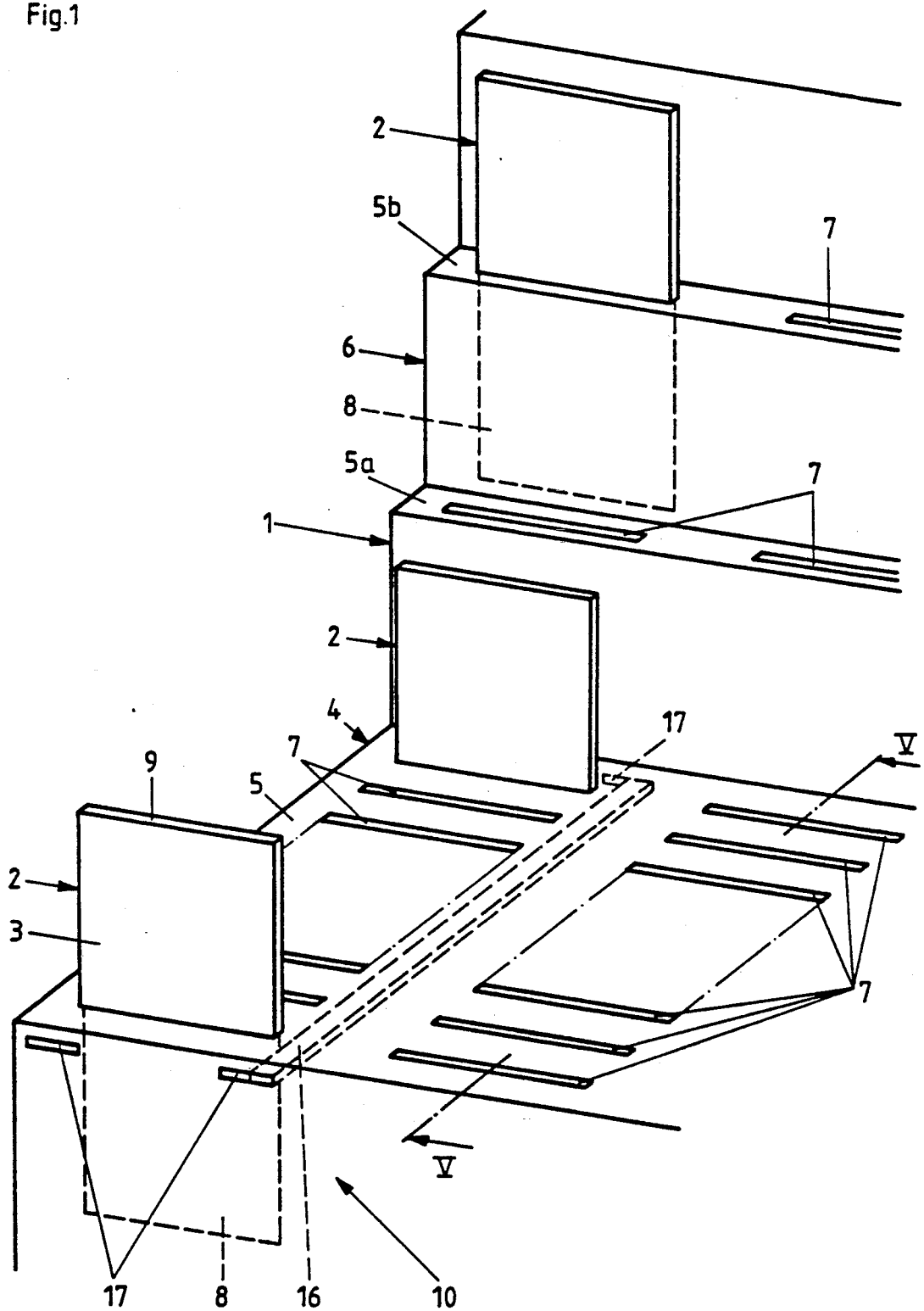

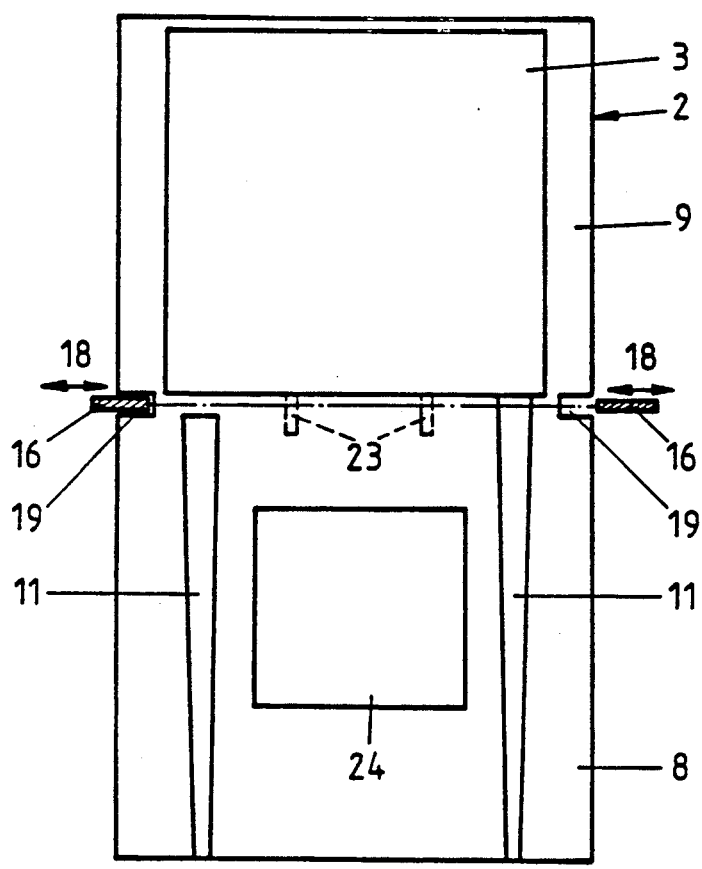
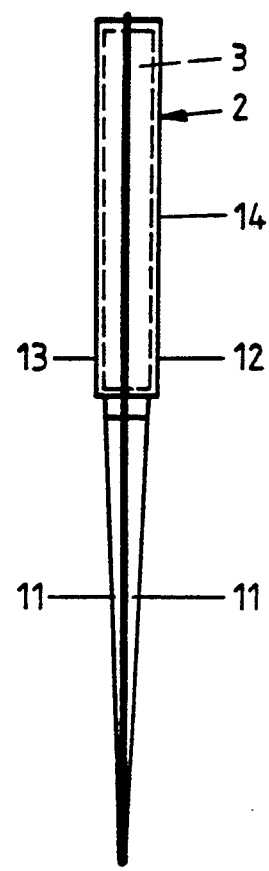
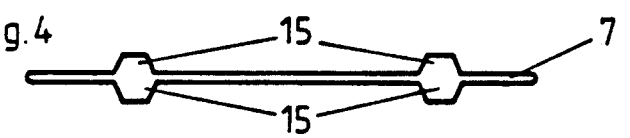
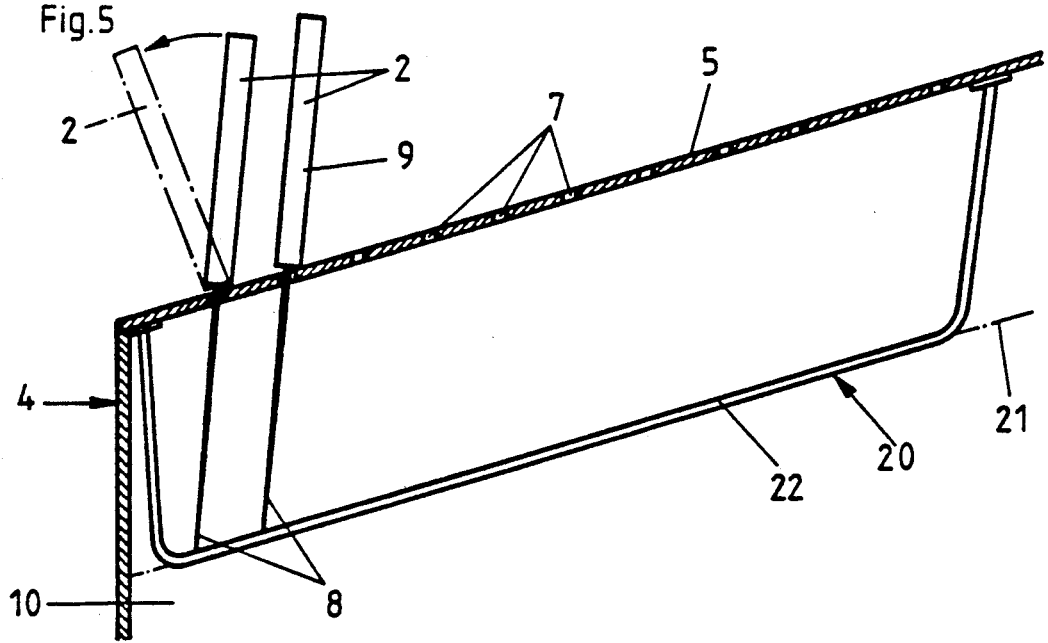

DEVICE FOR ACCOMMODATING FLAT BLISTER PACKS, AND BLISTER PACK

The invention relates to a device for accommodating and displaying flat blister packs with articles packed therein, particularly compact discs (CD), having a supporting base for supporting the blister packs in a substantially upright position.

From EP-A-155 258 and WO86/03327 are known devices for accommodating and displaying rigid flat articles, particularly CD cassettes aligned in rows one behind the other and adapted to be turned over like papers in a file cabinet. The articles are held each in slanted position only in their lower area, and for such purpose spaced bars are provided (EP-A-155 258) or base slots (WO86/03327). In the case of CD discs, these known devices are usually so inserted that empty CD cassettes, so-called "containers" are kept in the device and displayed, while the content, i.e., the discs themselves are separately therefrom kept at another place and only in the case of sale are transferred to the container at the there provided snap holder. This prevents theft, which otherwise would be easy due to the relatively small size of the CD cassettes. But keeping the containers and discs separately involves a considerable expense.

It has been also proposed (see DE-U-B502795) to provide CD cassettes, i.e. containers with discs in oversize bulky packs shaped as an elongated rectangular slip-in box; the CD cassette in an open, flatly spread condition is slid into the box and is there secured against unauthorized extraction by a springy snap extension. At the moment of sale, the CD discs are released and taken out from this pack by means of an available to the attendants special tool which unlocks the snap extensions. The packs are designed as hangers in the art similar to blister packs, and for such purpose they are provided on the upper side with a suspension opening in a strap-like suspension extension. Besides, these known hangers are of substantially constant thickness over their height. Although the oversize of these known hangers provides a satisfactory protection against stealing since they cannot be readily inserted into a pocket or the like, they are rather expensive to manufacture. In addition, as mentioned, their purpose is to be kept in suspended condition on a bar-shaped support or the like, which makes hardly possible an effective presentation, such as in devices of EP-A-155 258 or WO86/03327.

U.S. Pat. No. 2,593,927 shows another kind of device, possibly for keeping round records which stand on ledgers disposed inside a small box; the records are laterally held at about middle height by rhombic-shaped openings in an upper cover narrowing the side area to the ends. There is also known from French Patent 1 438 550 a trough-shaped accommodation device with side guide or holding slots made of grooved carton cut for disc-shaped articles, the slots being located in slanted side walls and reaching the base, but not extending there. The accommodation device of EP-A-190 546 has separate trough or pocket-shaped holders with the lower edge of plug feet in a kind of snap connection being pivotably disposed in an accommodation device; support noses abutting an edge of the accommodation body are provided in the pivotable holders at about half height for the additional support and for limiting the pivoting or determining the pivotable positions. The articles to be accommodated (packed) are then disposed in these pivotable holders. It is seen that all the above mentioned devices are of an expensive structure and/or are unsuitable for an effective presentation of the articles.

Finally, form German 2 854 366 is known a display device for small articles in cassettes, which one next to the other with a thin foot are inserted and locked in a longitudinally upwardly open slot of a profile rail which functions as a supporting part. But the cassettes are held stationary in their vertical position in the profile rail, so that, apart from structural disadvantages, as above mentioned, turning one after another is impossible.

The object of the invention is to provide a device of the above described kind for simply, directly and effectively displaying articles packed in blister packs, particularly CD discs, and to make possible turning if the packs are aligned in a row one after another.

The invention provides an apparatus for accommodating and displaying flat blister packs with therein packed articles, particularly compact-disc (CD) records, comprising a supporting base, supporting the flat blister packs in a substantially erect position, the supporting base having at least one slot-shaped opening and constituting the upper closure of a drawer, board or the like (4; 6), which has accommodation space below the supporting base to receive an extension provided below the respective area of each blister pack in which the article is packed, said extension being thin in comparison with said area, the length of the slot-shaped openings being at least equal to the width of the extension of the blister pack and the width of the slot-shaped opening being smaller than the thickness of the blister pack in the area of therein packed article, but at least equal to its thickness in the area of its extension, whereby the blister pack with its extension is insertable through the slot-shaped opening into the accommodation space and with the transition from the thinner extension to the ticker area, where each article is contained, is supportable at the edge of the slot-shaped opening.

Thus, according to the invention, blister packs provided with thinner lower extensions are supported and held in the area of the transition to the actual packing area by the edge area of slot-shaped openings of the supporting base, into which fit only the extensions. Therefore, important are here the fitting slot-shaped openings and the fact the room is provided below the supporting base for the thin extensions of the blister packs. The blister packs can be thus comfortably and securely held by simply inserting into the slot-shaped openings, until their thicker areas containing the articles abut the edge of the opening, and a better view of individual blister packs is made possible by pivoting the upper areas, possibly by taking advantage of the flexibility of the material of the blister packs.

The blister packs can simply consist of two plastic foils welded or glued to each other along their circumference, as has been amply known, there being provided in at least one foil a convexity for receiving an article, particularly a CD disc (under which is generally understood a cassette with the actual disc). In bulky blister packs of proper dimensions unauthorized insertion or pilfering is also here at least made difficult, if not impossible; on the other hand, the packing material can be so simple and inexpensive that the packing can be sold together with the packed article; furthermore, it is not so readily possible to tear the packing apart, take out the article and hide. Also, since the packs are inserted with their thinner bottom area into the slot-shaped openings, they can be kept securely and separately in a predisposed arrangement under easy supervision.

Above all, for optical reasons the accommodation space is preferably closed on all sides.

It is also advantageous for an easy to monitor accommodation of a plurality of blister packs to provide the supporting base with a plurality of slot-shaped openings in parallel longitudinal disposition, one after another in a row. For the same reason it is expedient if the supporting base has a plurality of rows one next to the other of slot-shaped openings. In this disposition of the blister packs on one or several rows, the packs can be disposed relatively closely, and turning (like in a file cabinet) is made possible by the fact that the blister packs due to the flexibility of the material can be forwardly and rearwardly bent over and deflected in the area of their support limited at the ends of the slot-shaped openings.

A particularly effective embodiment of the device of the invention in respect of an exceptionally effective display is characterized in that the supporting base providing the upper cover plate of a frame cabinet or the like is on the rear abutted by a step shelf therefrom upwardly extending, said steps being provided with slot-shaped openings on the upper side likewise forming a supporting base, preferably toward the rows in the cover plate.

In some cases, the facility of inspection can be increased by slanting supporting base increasingly rearwardly.

In order to position the blister pack in a row in a predetermined slanted position, in which it is led with its extensions (to avoid a "domino-effect" by the extensions on "turning"), it is also advantageous to provide an abutment in the accommodation space below the supporting base and parallel thereto abutted by the inserted blister packs with the lower edge of their extensions in the slanted position relative to the supporting base.

The abutment can be simply a separate bottom of a shelf spaced below the supporting base at a somewhat smaller distance than the length of the extensions of the blister packs below their support in the slot-shaped openings. The abutment can be also at least one bar or bracket inserted on the accommodation room; also here the distance of the bar or bracket from the supporting base should be correspondingly smaller in comparison with the length of the extension of the blister packs.

To prevent unauthorized removing of the blister packs from the device if proved to be expedient if at least one locking bar, e.g., of flat steel is provided along each row of slot-shaped openings transverse to the direction of the rows and which can be slid from a rest position next to the blister packs to a locking position in which it engages with lateral slots in the blister packs.

Attendance is made simpler if in case of a plurality of lock bars they are coupled together for an actuation in common, e.g., mechanical.

To make virtually impossible the folding of blister packs for easier slipping in of blister packs for stealing, the blister packs can be provided with longitudinal stays. Such stays can be shaped in one step when at least one of the plastic foils is shaped, e.g., by deep-draw or blowing, and they can be of such size that while allowing a deflection of the upper part of the blister pack by a certain angle, say 30 degrees, they prevent a folding by 180 degrees. For receiving such blister packs with longitudinal stays in the extensions, the slot-shaped openings can be designed with cross recesses accommodating the stays.

The specification will now describe the most preferred embodiments of the invention accompanied by the drawings wherein:

FIG. 1 is a perspective view of a part of the device for accommodating and displaying CD discs in blister packs;

FIG. 2 is a diagram of such blister pack with the therein packed CD disc, also showing a cross-sectional diagram of the corresponding lock bars;

FIG. 3 is a side diagram of the blister pack of FIG. 2;

FIG. 4 is a top view diagram of a slot-shaped opening for inserting the blister pack of FIGS. 2 and 3;

FIG. 5 is a vertical diagram in cross-section through the lower part of the device of FIG. 1, showing the accommodation space below the supporting base and a therein provided abutment for the extensions of the blister packs.

FIG. 1 shows a device 1 for displaying CD discs (including containers) packed in blister packs. The display device 1 consists, for example, of a lower frame board part 4, closed all around and e.g., a rearwardly rising upper side, which forms a supporting base 5 for the blister packs 2, as further on will be explained in greater detail. A step partition 6, upwardly extending, joins the rear end of the frame board part 4. The upper sides of the steps of said partition 6 likewise form a supporting base 5a or 5b for the blister packs 2.

Each supporting base 5 or 5a, 5b has longitudinal, slot-shaped openings 7 of such length that the blister packs, as seen in FIG. 1, according to the width, can be inserted in them. But the width of these slot-shaped openings 7 is such that although the blister packs 2 with their lower, thinner portion constituting an extension or continuation 8 can pass through the slot-shaped openings 7, as seen in FIGS. 1 and 5, they cannot do so with their upper area or portion 7, where the CD discs 3 are enclosed; see also FIGS. 2 and 3 and FIG. 5. This makes the blister packs 2 to lean in their position inserted in the corresponding slot-shaped opening, as seen in FIGS. 1 and 5, with their shoulder shaped transition from the extension 8 to the upper area 9 containing the CD disc 3 in the edge area of the slot-shaped openings 7, so that mainly only the area or portion 9 of the blister pack 2 with the enclosed CD record 3 above the supporting base 5 or 5a, 5b remains visible. But the extensions 8 of the blister pack 2 are located in accommodation space 10 below the supporting base; in addition to FIG. 1, see also FIG. 5.

More particularly, a plurality of rows of slot-shaped openings 7 tightly spaced one after another are provided in the supporting base 5 of the lower frame board part 4; for the sake of simplicity FIG. 2 shows only two rows and not all slot-shaped openings in each row. For example, step partition 6 has in each supporting base 5a or 5b slot-shaped openings 7 disposed over and after each other always toward the rows in the partition board part 4.

According to FIGS. 2 and 3, the blister packs 2 can have longitudinal stays in the area of extensions 8, for example two stays 11 on each front side and the rear side. Such stays 11, as the blister packs themselves, are of conventional production and need no further description. It should be mentioned only that, as seen in FIG. 3, for example in the production of blister packs 2 with the therein enclosed CD discs 3, two identical, preformed, e.g., by deep-draw or blowing pack parts 12 or 13, each having stays 11 or upper blister parts 14 for accommodating CD discs are firmly joined to each other along the circumference, e.g., by welding or gluing. But instead of such embodiment it is also conceivable to provide a blister pack with a plain rear side and a front pack part correspondingly having an upper blister part and lower stays.

Naturally, the blister pack can be also so designed in the area of the lower extension 8 that its both pack parts 12 or 13 are flatly joined, e.g., by welding.

In the case of blister packs with stays 11, as shown in FIGS. 2 and 3, the slot-shaped openings 7 should be shaped to provide space for accommodating the stays 11. According to FIG. 4, the slot-shaped opening 7 has in such case cross cavities 15 of corresponding size to receive the stays 11; besides, the slot-shaped opening 7 is narrow, i.e., just sufficiently wide (and long) to let the thin lower extension 8 of the blister pack 2 pass through, as mentioned.

FIG. 2 shows in cross-section a diagram of lock bars 16 on both sides of the blister pack. These lock bars 16, which can be as shown of flat steel, possibly also of round steel, are in a conventional way slidingly horizontally back and forth supported at their front and rear ends in friction bearings or the like (identified in FIG. 1 at 17) disposed in the board part 4 (FIG. 1), as also indicated in FIG. 2 with double arrows 18. These lock bars 16 are slidable from a rest position shown in FIG. 2 on the right side to their locking position shown in FIG. 2 on the left side, in which they engage lateral notches or recesses provided at the upper end of extension 8 on the long sides of the blister pack 2, particularly in the form of rectangular slots 19. Accordingly, the lock bars 16 secure in this locking position, in engagement with the slots 19, the blister packs against removal from the slot-shaped openings 7 in the supporting base 5. Well known means can be used for actuating the lock bars 16, i.e., for their horizontal shift, means as used for locking drawers, e.g., in desks; no closer description is necessary. In the case of a plurality of rows of slot-shaped openings 7 and of blister packs 2, as shown in FIG. 1, it is also expedient to couple together all lock bars 16 for actuation in common, i.e., sliding into or from the locking position; a mechanical set of levers, also in a known manner as in locking desks, can be here applied.

FIG. 5 shows the oblique rearward rise of the supporting base 5. But such a slanted disposition is not absolutely necessary; the supporting base can be also horizontally disposed. In the case of slot-shaped openings 7 being aligned in a row one after another, as shown in FIGS. 1 and 5, it is expedient to hold the blister packs 2 inserted one after another in a predetermined position of rest relative to the supporting base 5, obliquely rearwardly inclined to prevent, on turning, a forward turn-about of the entire blister packs 2, with their extensions 8 being turned backward, since otherwise in turning over the first blister pack of a row and in a correspondingly narrow disposition, due to the "domino effect" the blister packs 2 of the entire row would be unintentionally tuned over. In order to obtain this predetermined oblique position of the blister packs 2 relative to the supporting base 5, as seen in FIG. 5, an abutment generally identified as 20 in FIG. 5, is provided inside the accommodation space 10, into which extend the extensions 8 of the blister packs 2; this is provided, for example, by in dot-dash line diagrammatically illustrated sheet bottom 21 or by bar or bracket 21 shown by full line. The bracket 22 has its vertical shoulders screwed for example to the bottom side of the supporting base. Preferably, for each row of the blister packs 2 are provided two such brackets 22 about toward the stays 11 on the blister packs 2 (see FIG. 2) and thus toward the cross recesses 15 of the openings 7 in the support base (see FIG. 4). The so shaped abutment 20 extends at a distance in parallel to the lower side of the supporting base 5, said distance being smaller than the length of extensions 8 of the blister packs 2, the result being a slanted position of the blister packs 2 relative to the supporting base, as seen in FIG. 5. Insofar the blister packs 2 are turned over forwardly one after another for inspection in the upper area, as shown in dotted line in FIG. 5 at the foremost blister pack 2, such turning over is made possible by the flexibility of the material of the blister packs 2 in the transition area from the upper part 9 to the extension 8; but the extensions 8 are held by abutment 20 in the illustrated position. The material of the blister packs 2 can be so flexible that a deflection of the upper part 9 of the blister packs 2 is possible only by a certain angle, about 30 to 40 degrees. To make this predetermined deflection or bending over easier by the flexibility of the material, it can be also expedient to end the stays 11 still before the transition to the thicker part of the blister packs, as shown in FIG. 2 at the stay 11 on the left side. But as a rule, the limited deflectivity, as described, is achieved with stays 11, which extend up to the upper, thicker part 9, in which the CD disc is enclosed, as shown in FIG. 2 at the stay on the right side. Where the stays 11 end still ahead of the thicker part 9 containing the CD disc 3, small, short stays 23 can be formed into, as shown in dotted line in FIG. 2, to control the deflection of this upper part 9 of the blister pack 2. Besides, also the lateral slots or recesses 19 contribute to determining the axis area of deflection or turn-over on the blister packs. Essential is only that the blister pack 2 be altogether rigid, regardless of the deflection of the upper part 9 by the described angle for preventing the blister packs 2 from lying together, which would make theft easier.

Extensions 8 of the blister packs 2 can be used for inscriptions or the like, as indicated in FIG. 2 at 24.

The preferred embodiments of the invention have been here described, but changes and modifications are possible, without departing from the framework of the invention. It is conceivable, for example, that the extensions 8 of the blister packs 2 be narrower than the upper part 9, with the slot-shaped openings 7 being then correspondingly shorter. It is also conceivable to apply no stays or only one stay 11 or three stays on the extensions 8 of the blister packs 2. The step partition part 6 of the device 1 shown in FIG. 1 can be higher and, accordingly, have two steps more, and it is also conceivable to dispose on each of the steps a plurality of blister packs 2 one after another, so that in each case there are available a plurality of slot-shaped openings 7 one after another in a corresponding row.

I claim:

1. A device accommodating and displaying generally flat blister packs, each of which has an upper accommodation portion accommodating and packing a generally flat article and a lower extension portion with a thickness being thinner than the upper accommodation portion, said device comprising at least one supporting base supporting the flat blister packs in a substantially erect position, said supporting base constituting an upper surface of and defining thereunder an accommodation space; a plurality of slot-shaped openings formed on said supporting base through which the lower extension portions of the flat blister packs are inserted into the accommodation space and supported by their upper accommodating portions at edges of said slot openings respectively; and an abutment means provided at a distance below and being parallel to the supporting base abutting lower edges of the extension portions of the flat blister packs thereby inclining the flat blister packs towards the supporting base.

2. The device of claim 1, wherein the accommodation space is closed on all sides.

3. The device of claim 1, wherein said plurality of slot-shaped openings are aligned in a row one behind the other with their longitudinal directions in parallel.

4. The device of claim 3, wherein on the supporting base a plurality of rows one next to the other of said slot-shaped openings are formed.

5. The device of claim 3 or 4, wherein at least one lock bar provided along each said row of slot-shaped openings is slidable in a direction transversely to the direction of the rows from a position of rest next to the blister packs into a locked position in engagement with lateral slots formed in said blister packs.

6. The device of claim 5, wherein a plurality of lock bars are coupled together for actuation in common.

7. The device of claim 4, wherein the supporting base is in the rear joined by a step partition upwardly extending therefrom, on said partition formed is at least another supporting base comprising a plurality of slot-shaped openings, preferably aligned with the rows of said openings in said one supporting base.

8. The device of claim 1, wherein the supporting base slantingly rises upwardly.

9. The device of claim 1, wherein the abutment is formed by a separate drawer base.

10. The device of claim 1, wherein the abutment is formed by a bar or a bracket inserted in the accommodation space.

11. The device of claim 1, wherein each of the slot-shaped openings has transverse recesses for receiving at least one stays formed in the extension portion of each said blister pack.

12. The device of claim 1, wherein the article is a compact-disc (CD) record.

* * * * *

UNITED STATES PATENT AND TRADEMARK OFFICE
CERTIFICATE OF CORRECTION

PATENT NO. : 5,090,560
DATED : February 25, 1992
INVENTOR(S) : Otto SCHUBERT

It is certified that error appears in the above—identified patent and that said Letters Patent is hereby corrected as shown below:

ON THE TITLE PAGE

Item [30], change "[AU] Australia" to --[AT] Austria--.

Signed and Sealed this

Twentieth Day of July, 1993

Attest:

MICHAEL K. KIRK

Attesting Officer

Acting Commissioner of Patents and Trademarks